(12) United States Patent
Viaene et al.

(10) Patent No.: US 10,743,471 B2
(45) Date of Patent: Aug. 18, 2020

(54) METHOD FOR DIRECTING A CAMERA SYSTEM ON AGRICULTURAL MACHINERY

(71) Applicant: CNH Industrial America LLC, New Holland, PA (US)

(72) Inventors: Karel M. C. Viaene, Moorslede (BE); Bart M. A. Missotten, Winksele (BE); Bernard E. D. Depestel, Odelem (BE)

(*) Notice: Subject to any disclaimer, the term of this patent is extended or adjusted under 35 U.S.C. 154(b) by 472 days.

(21) Appl. No.: 14/357,744

(22) PCT Filed: Nov. 9, 2012

(86) PCT No.: PCT/EP2012/072339
§ 371 (c)(1),
(2) Date: May 12, 2014

(87) PCT Pub. No.: WO2013/068574
PCT Pub. Date: May 16, 2013

(65) Prior Publication Data
US 2014/0300707 A1    Oct. 9, 2014

(30) Foreign Application Priority Data

Nov. 10, 2011 (BE) .................................. 2011/0658

(51) Int. Cl.
*A01D 75/18* (2006.01)
*H04N 13/204* (2018.01)
(Continued)

(52) U.S. Cl.
CPC ......... *A01D 75/182* (2013.01); *A01D 43/087* (2013.01); *B60R 1/002* (2013.01);
(Continued)

(58) Field of Classification Search
CPC ............. H04N 13/021; H04N 13/0214; H04N 13/0221; H04N 13/204; A01D 75/182; A01D 43/087
(Continued)

(56) References Cited

U.S. PATENT DOCUMENTS 6,012,272 A    1/2000  Dillon
6,113,343 A *  9/2000  Goldenberg ............. B25J 5/005
                                                        239/587.2
(Continued)

FOREIGN PATENT DOCUMENTS

CN        102217457 A      10/2011
DE         1426059 A1       2/1996

*Primary Examiner* — Clifford Hilaire
*Assistant Examiner* — Kristin Dobbs
(74) *Attorney, Agent, or Firm* — Patrick Sheldrake; Peter Zacharias (57) ABSTRACT

An agricultural harvesting machine, equipped with a movable unloading apparatus to transport crop material to a container driven in the vicinity, so that the container, seen from the harvester, has a near upper border and a remote upper border, and wherein a 3D camera is provided on the harvester for capturing images in which at least the near border can be seen, to direct the unloading apparatus based on these images. The camera is rotatable mounted around a substantially horizontal axis. The angle of rotation of the rotatable camera can be arranged such that the near border always remains in the field of view of the camera. The unloading apparatus can be controlled such that the processed crop material is deposited in the container at a predetermined distance from the near border.

7 Claims, 6 Drawing Sheets

(51) Int. Cl.
*A01D 43/08* (2006.01)
*B60R 1/00* (2006.01)
*B60R 11/04* (2006.01)
*B60R 11/00* (2006.01)

(52) U.S. Cl.
CPC ........... B60R 11/04 (2013.01); H04N 13/204 (2018.05); *B60R 2011/004* (2013.01); *B60R 2011/0085* (2013.01)

(58) Field of Classification Search
USPC ......................................................... 348/50
See application file for complete search history.

(56) References Cited

U.S. PATENT DOCUMENTS

| | | |
|---|---|---|
| 8,499,537 B2 | 8/2013 | Correns et al. |
| 8,656,693 B2 | 2/2014 | Madsen et al. |
| 8,682,540 B2 | 3/2014 | Missotten et al. |
| 2009/0044505 A1 | 2/2009 | Huster et al. |
| 2010/0063692 A1* | 3/2010 | Madsen ............... A01D 43/073 701/50 |
| 2011/0061762 A1* | 3/2011 | Madsen ............... A01D 43/087 141/1 |

* cited by examiner

METHOD FOR DIRECTING A CAMERA SYSTEM ON AGRICULTURAL MACHINERY

This application is the US National Stage filing of International Application Serial No. PCT/EP2012/072339 filed on Nov. 9, 2012 which claims priority to Belgian Application BE2011/0658 filed Nov. 10, 2011, each of which is incorporated herein by reference in its entirety.

FIELD OF THE INVENTION

The present invention relates to agricultural harvesting machines, such as combine or forage harvesters, equipped with an unloading apparatus (such as a spout) for filling harvested and processed crop materials into a container travelling alongside the harvester. More specifically, the invention relates to methods for controlling the filling of such a container on the basis of image data.

STATE OF THE ART

In forage harvesters of the above type, control of the spout position and of the position of a pivotable end portion (flap) of the spout on the basis of camera images is known in the art. Patent publication WO-A-2011101458 describes a system in which a 3D camera is arranged on the discharge spout. The camera takes images of the container driving next to the machine. These images define at least two vertical strips. Analysis of these strips provides the position of the front and/or rear wall of the container relative to the camera. Based on this information, the spout is controlled so that the crop material is unloaded in the container. When using 3D camera types that have a limited vertical viewing angle, but where the result is advantageous in terms of light sensitivity and resolution, there is a risk that the container or at least the near border of the container disappears out of sight of the camera, so that the correct filling is no longer ensured.

MAIN FEATURES OF THE INVENTION

The invention provides a solution to the above-described problems by the use of an agricultural harvesting machine and methods as described in the appended conclusions.

The invention therefore relates first to a harvesting machine equipped with a movable unloading apparatus to transport crop material to a container driven in the vicinity of the harvesting machine, so that the container, seen from the harvester, has a near upper border and a remote upper border, and wherein a 3D camera is provided on the harvester for capturing images in which at least the near border can be seen, to direct the unloading apparatus based on these images, the camera being rotatably mounted around an substantially horizontal axis.

The unloading apparatus is preferably a discharge spout which is rotatable around a vertical axis and which at its end is equipped with a rotatable part, also called a flap, which serves to direct the flow of processed crop material in the container. The spout can itself be rotated around a horizontal axis, by which the height of the flap itself can be controlled. The camera is preferably located on the bottom of the discharge spout. The rotation axis of the camera may be parallel to or coincide with the horizontal axis of rotation of the discharge spout.

A harvester according to the invention may further be equipped with a light source which is also rotatably mounted in the vicinity of the camera, and wherein the light source and camera are configured to simultaneously rotate around the same or different horizontal axes.

On a harvester according to the invention the unloading apparatus may consist of a discharge spout with a hinged flap at the end, the camera and the light source being fixed to the bottom of the discharge spout and configured to pivot about two different, mutually parallel axes, the axis of rotation of the light source being located between the axis of rotation of the camera and the hinged flap.

The rotation of the light source or of the camera can be controlled by a linear actuator, a mechanical connection being present between the light source and the camera, so that any rotation of the light source is also carried out by the camera, or vice versa.

The rotation of the camera and the light source can also be controlled by separate actuators, which may themselves be controlled by the same control signal.

The invention further relates to a method for directing a movable unloading apparatus of a harvester to a container which is driven in the vicinity of the harvesting machine, the container, as seen from the harvester, having a near upper border and a remote upper border, and wherein the method comprises the following steps:
  using a 3D camera on the harvester for capturing images in which at least the near border can be seen, and the camera generating image data containing information on the distance between the camera and the near border;
  processing the image data for deducing therefrom data on the relative position between the near border and unloading apparatus; and
  using the relative position data for automatically moving the unloading apparatus relative to the harvesting machine,
  characterized in that the camera is mounted rotatably around a substantially horizontal axis of rotation, and wherein the angular position of the camera around this axis is controlled so that the near border remains within a predetermined area of the observed image of the camera during the movement of the harvester and/or the container.

The position of the near border may be detected on the basis of at least two vertical strips which are defined in the image observed by the camera of the container.

According to an embodiment of the method, the predetermined area is a strip between two parallel lines located in the lower half of the observed image of the camera, the method comprising the following steps:
  detecting the near border;
  if the border is visible, but none of the positions of the border, as determined by analysis of the vertical strips, is located between the lines:
    detecting whether the border is located above or under the strip,
    if the border is located above the strip, turning the camera upwards, and as soon as at least one of the positions is in the strip, maintaining the camera position,
    if the border is under the strip, rotating the camera downwards, and as soon as at least one of the positions is located in the strip, maintaining the camera position; and
  if the border is not visible in the image, moving the camera to a predetermined starting position.

The starting position is preferably a position in which the camera is directed in such a way that the observed image does not only contain the remote border of the container.

According to an embodiment, in which the unloading apparatus consists of a spout and a hinged flap on the end of the spout, the position of the flap is controlled on the basis of the detected distance from the near border to the camera, in such a way that the flap is continually directed to a point located at a predetermined distance from the near border.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
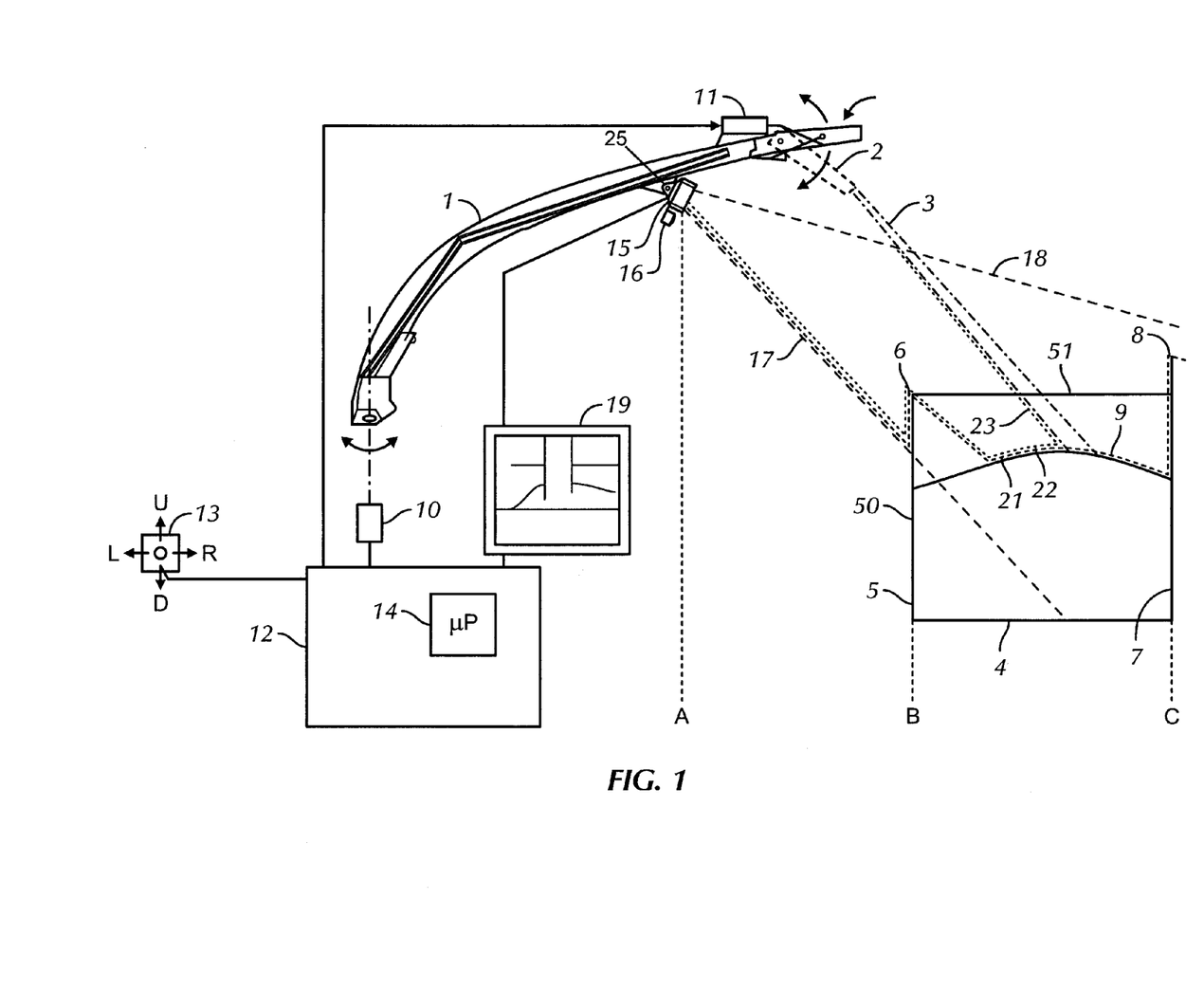
FIG. 1 is a view of the filling spout of a harvester, equipped with a rotating 3-D camera and a light source.

FIG. 1 is a schematic image of a discharge spout 1, the base of which is mounted for rotation about a vertical axis and pivotment about a horizontal axis on a forage harvester (not shown), in a manner known in the art. The spout mount is equipped with an actuator, e.g., a hydraulic motor 10, for changing the angular position of the spout, and a further actuator, e.g., a hydraulic cylinder (not shown), for changing the height of the spout end. The spout further has a pivotable flap 2 at its end, equipped with a third actuator, e.g., a linear electrical actuator 11. The three actuators are controlled by a control system 12 configured to direct the stream 3 of processed crop material into a container 4, governed by a manual control 13 or by a microprocessor 14. The container has a near side wall 5, closest to the forage harvester and having an upper border 6, and an opposite, remote side wall 7 having an upper border 8. Crop material is deposited into the container 4 and forms a heap 9 therein. A 3-D camera 15 and a light source 16 are mounted on the spout, in the position shown below the flap 2. The camera is configured to produce the image 19 as an array of pixels, and to determine the values of the distance from the camera to the object in the image, for each pixel in the image. This distance may be determined on the basis of the time-of-flight principle. The field of the camera is represented by the border lines 17 and 18.

The light source is preferably a Near Infra Red (NIR) lamp, which emits modulated light with a certain wavelength. Reflected light of the same wavelength is captured by the camera. In a machine according to the invention, the camera 15 is rotatable about a horizontal axis 25, or in other words, an axis which is perpendicular to the median plane of the spout 1. If a light source 16 is present, it is preferably also rotatable around a horizontal axis. In the arrangement of FIG. 1, the light source 16 is a spotlight fixed at the bottom of the camera 15, and can be pivoted together with the camera around the axis 25. According to a preferred embodiment, which is described later in this text, the camera and the light source are implemented in such a way that the camera and the light source rotate simultaneously, but not around the same axis. The rotation of the camera is achieved by an actuator (not shown in FIG. 1), preferably an electric linear actuator which is controlled by a signal from the control system 12. The invention also relates to a method for controlling the rotation of the camera in such a way that a desired part of the container always remains in the image. This method is explained below in combination with the method described in WO-A-2011/101458, for the detection of the border 6. The invention can, however, also be used in combination with other detection methods.

Figure 2:
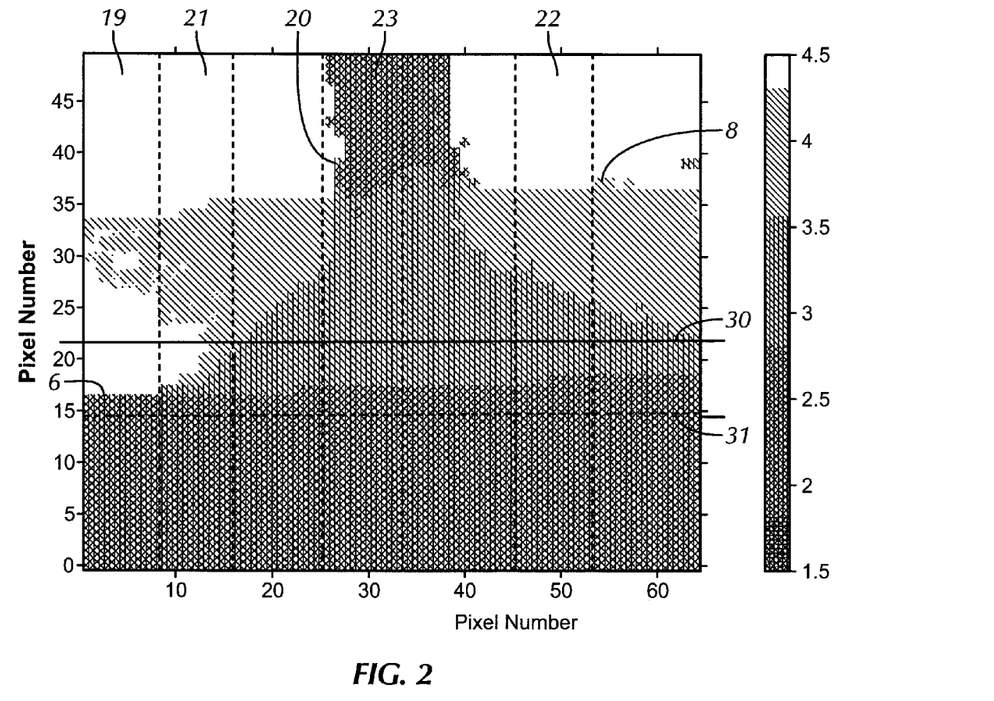
FIG. 2 shows an example of an image of the container as seen by the camera, and shows the limits within which the container border must be maintained during the application of the method of the invention.

To be able to apply the method of WO-A-2011/101458, the position of the camera with respect to the container 4 is such that in the horizontal direction, the camera is placed to one side of the container (i.e. the horizontal position A of the camera is not located between the transverse horizontal locations B and C of the side walls 5 and 6 of the container). In the vertical direction, the camera preferably is placed higher than the upper borders 6 and 8 of the side walls 5 and 7 of the container. As a consequence, the camera takes images in which the front surface of at least the near side wall 5 and possibly also the remote side wall 7 is visible (i.e. the surface facing the harvesting machine), as well as the near upper border 6 and possibly the remote upper border 7 of these side walls, as shown in the example in FIG. 2. The near upper border 6 (of the near side wall 5) is represented in the lower portion of the image, while the remote upper border 8 (of the remote side wall 7) is represented in the upper portion of the image. The image in FIG. 2 is taken while the spout is delivering crop material into the container. This ejected crop material is visible as a central region 20 in the image.

According to the method of the invention described in WO-A-2011/101458, the image in FIG. 2 is analyzed in order to detect at least the position of the near upper border 6 and, if visible, also the remote upper border 8. The front and rear border of the container 4 may appear in the left or right portion of the image, depending on the side of the forage harvester where the container is travelling. In an image as shown in FIG. 2, a first and second vertical strip 21 and 22 are selected, said strips respectively being located to the left and right of the spout, i.e. to the left and right of the central region 20 in the image. According to a preferred embodiment, a third vertical strip 23 is selected in this central region 20. Each of the selected strips comprises a stack of rows of pixels, each row corresponding to a vertical position on the image, each pixel having a corresponding distance value, derived from the data contained in the image (given that the image is taken by a 3D time-of-flight camera). The distance data for each vertical position are then filtered to remove dubious values (e.g. an object that is too far or too close, or too small amplitude of the reflected light) and to generate a single filtered distance value for that vertical position. According to the preferred embodiment, the filtered distance value equals the mean distance value for each vertical position in the strip.

Figure 3A:
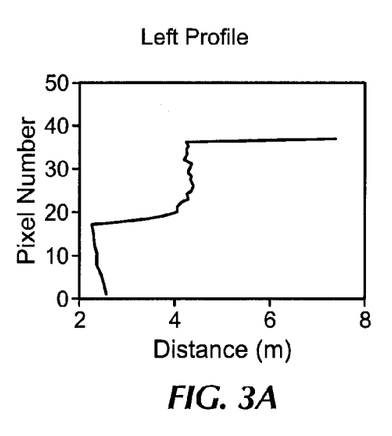
FIG. 3 illustrates the method of determining the border of the container to be detected on the basis of the camera image.
Figure 3B:
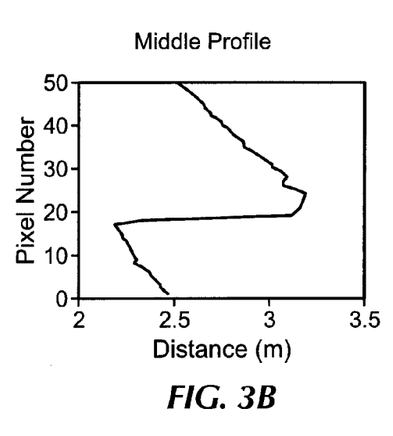
Figure 3C:
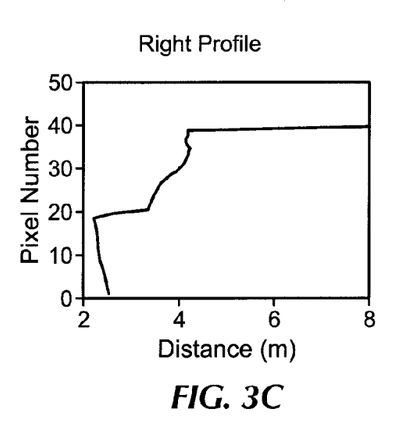
Figure 3D:
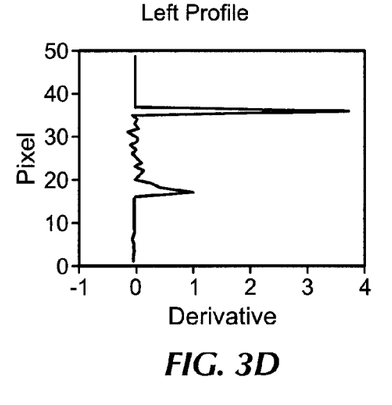
Figure 3E:
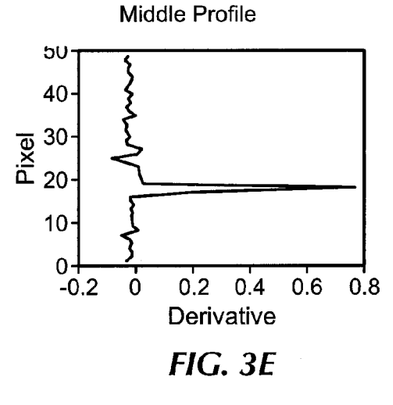
Figure 3F:
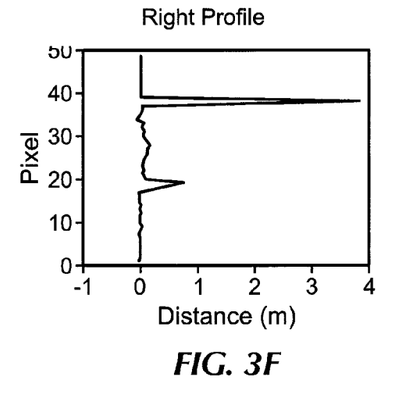

With the filtered values, three distance curves are obtained, as shown in FIGS. 3A to 3C, corresponding to the filtered distances in strips 21, 23 and 2 respectively. The curves corresponding to the left and right strip 21 and 22 show clear jumps or leaps in the distance value in the regions where the near and remote upper borders 6 and 8 are shown. The curve corresponding to the central strip 23 shows a jump only at the location of the near upper border 6, given that the remote upper border is hidden behind the ejected crops in region 20. The vertical position of at least one upper border 6 or 8 is obtained from the location of one or both jumps, and the position of the spout 1 and flap 2 relative to the harvesting machine is controlled so as to direct the harvested crop into the container, i.e., to a position above the near upper border 6 and/or below the remote upper border 8. According to the preferred embodiment, the first and/or second derivative of the curves in FIGS. 3A to 3C are used, in combination with the measured distance itself, as the basis for determining the vertical positions of the borders 6 and 8. As seen in FIGS. 3D to 3F, the first derivatives show sharp peaks at the location of borders 6 and 8. Such peaks can be more easily detected than the jumps in the distance curves in FIGS. 3A to 3C. Likewise, the second derivatives show similar peaks and can thus also be used as a basis for determining the position of borders 6 and 8. When the first and/or second derivative is higher than a predetermined threshold, it can be held that a border has been found.

The method according to the invention is explained below in combination with the above-described image processing system. The method of the invention makes use of the fact that the camera 15 is installed with rotation capability. Two horizontal lines 30 and 31 are in the field of view of the camera, defined in the lower part of the image, see FIG. 2. The method according to the invention consists in rotating the camera in such a way that at least a portion of the near upper border 6 of the container (lower border in the image) is always between these two lines. The method includes the following steps:

detecting the near border 6, via the above-described analysis of the three strips 21, 22, 23,
  if the border is visible, but none of the three positions of the border 6, as determined by analysis of the three strips, is extending between the lines 30 and 31:
    detecting if the border 6 is situated above or below the strip 30/31,
    if the border 6 is situated above the strip 30/31, rotating the camera upwards, and as soon as at least one of the three positions is in the strip 30/31, maintaining the camera position,
    if the border 6 is located under the strip 30/31, rotating the camera downwards, and as soon as at least one of the three positions is in the strip 30/31, maintaining the camera position,
  if the border is not visible in the image, moving the camera to a predetermined starting position. This can occur e.g. when the machine is travelling on an already harvested strip of land on the border of the field (so-called headland).

Thus, it is determined whether at least one of the three positions is within the strip 30/31. When the camera (and the spout) is perpendicular to the container border 6, the three positions are normally on a line, running more or less parallel to the lower border of the observed image (as shown in FIG. 2), in other words, the three positions can be located simultaneously in the strip 30/31. However, when the spout is not perpendicular to the border of the container (see e.g. FIG. 6*b*), the border 6 is observed at an angle, and the representation of the border 6 is not parallel to the bottom of the image. In this case, it is sufficient that the highest or lowest of the three positions in the image is located in the strip 30/31 to ensure that the border remains "visible" to the camera. The relative position and size of the harvesting machine and container are preferably such that the deviation of the border 6 in the image from the horizontal orientation is never very large.

The above steps are continually run through during the operation of the harvester. While driving next to the container its top border automatically remains in the image so that a correct filling is guaranteed. If while turning or otherwise maneuvering the border 6 gets out of the image, the camera automatically moves to the starting position, from which the control can be resumed. The starting position is a position in which the camera is rotated to a position from which it is impossible to see the remote border 8 only. This is preferably a position in which the camera is directed to the lower side of the container so that neither the near border 6, nor the remote border 8 is in the frame. The starting position as defined above ensures that in the search for the near border 6, the remote border 8 is not considered by mistake to be the near border 6. In the (re) start of the method, the camera from the starting position is rotated upwards until the border 6 comes in the image. From that point on, the above steps are carried out (again).

Figure 4:
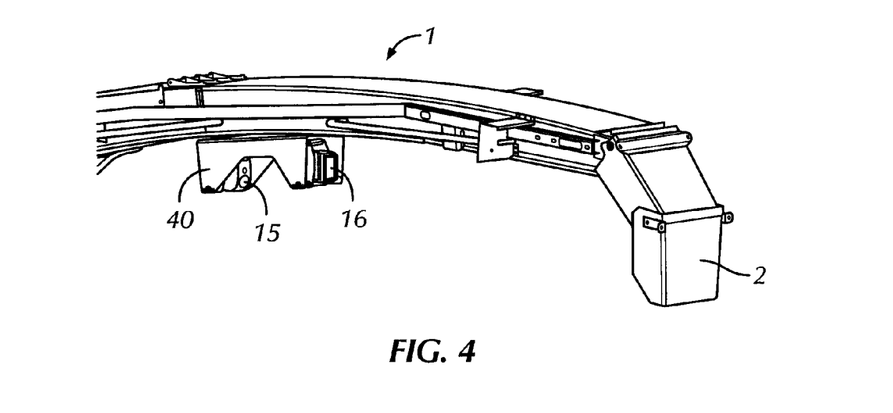
FIG. 4 shows an arrangement of a 3D camera and a light source in accordance with a preferred embodiment.
Figure 5A:
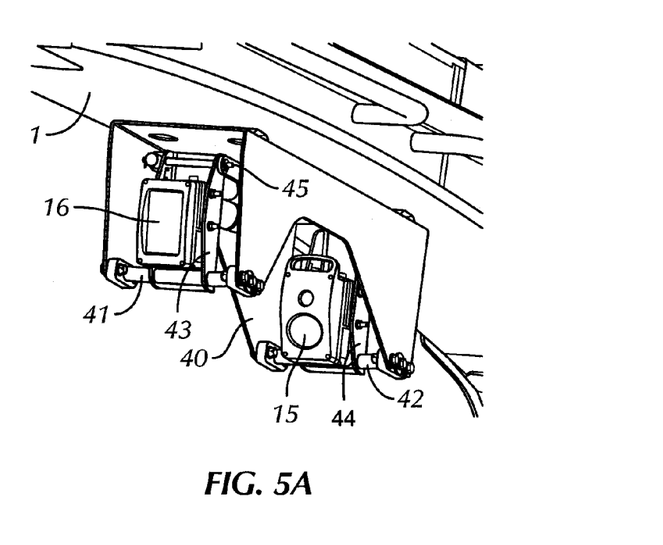
FIGS. 5a and 5b show the arrangement of FIG. 4 in more detail.
Figure 5B:
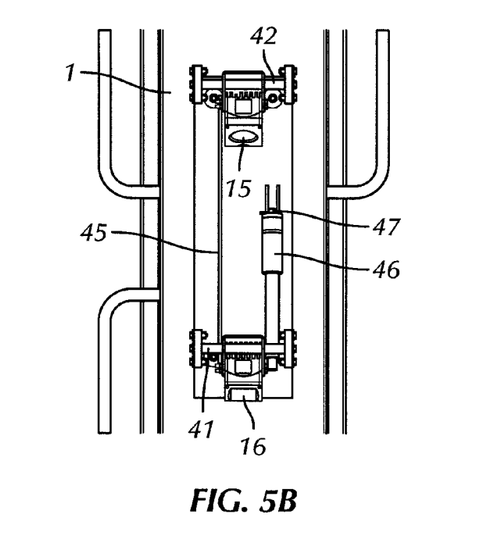

As mentioned above, the light source 16 is preferably also rotatably arranged, and preferably in such a way that it rotates simultaneously with the camera. A preferred arrangement in order to implement it, is shown in FIGS. 4 and 5*a*/5*b*. A housing 40 made of sheet steel is fastened to the bottom of the spout 1. The light source 16 and camera 15 are respectively mounted on sheet steel brackets 43 and 44, which are affixed to the shafts 41 and 42, mounted on bearings in the housing. In this way, the supports 43/44 and also the light source and camera rotate around the axes of the shafts 41 and 42. A pivotal mechanical connection 45 between points lying at the top of the supports 43/44 ensures that the light source and camera rotate simultaneously. This rotation is controlled by a linear actuator 46, which can move a point at the top of the support 43 of the light source forward and backward with respect to a fixed point 47 of the housing. The actuator 46 is preferably an electric actuator that is equipped to receive a control signal to rotate the camera and the light source into a desired position, for example on the basis of the method described above.

The distance between the camera and the light source contributes to the quality of the camera image, particularly in circumstances in which a lot of dust is present in the air during the harvesting. Simultaneously controlling the rotation of the camera and the light source is particularly advantageous when a light source is used which illuminates an area which approximately corresponds to the field of view of the camera, determined—in the vertical plane—by the angle between the lines 17 and 18 in FIG. 1. The simultaneous rotation ensures that the majority of the emitted light actually falls on the desired zone. Instead of a mechanical connection 45 between the camera and the light source, this simultaneous operation can also be carried out by software. In this case, the camera and the light source are each driven by their own actuator, e.g. a servomotor on each of the shafts 41 and 42, which actuators are controlled by the same control signal. This latter arrangement also enables a control in which the rotation of the camera does not depend on the rotation of the light source, e.g. when one wishes to use a light source that covers a larger area than the field of view of the camera.

Figure 6A:
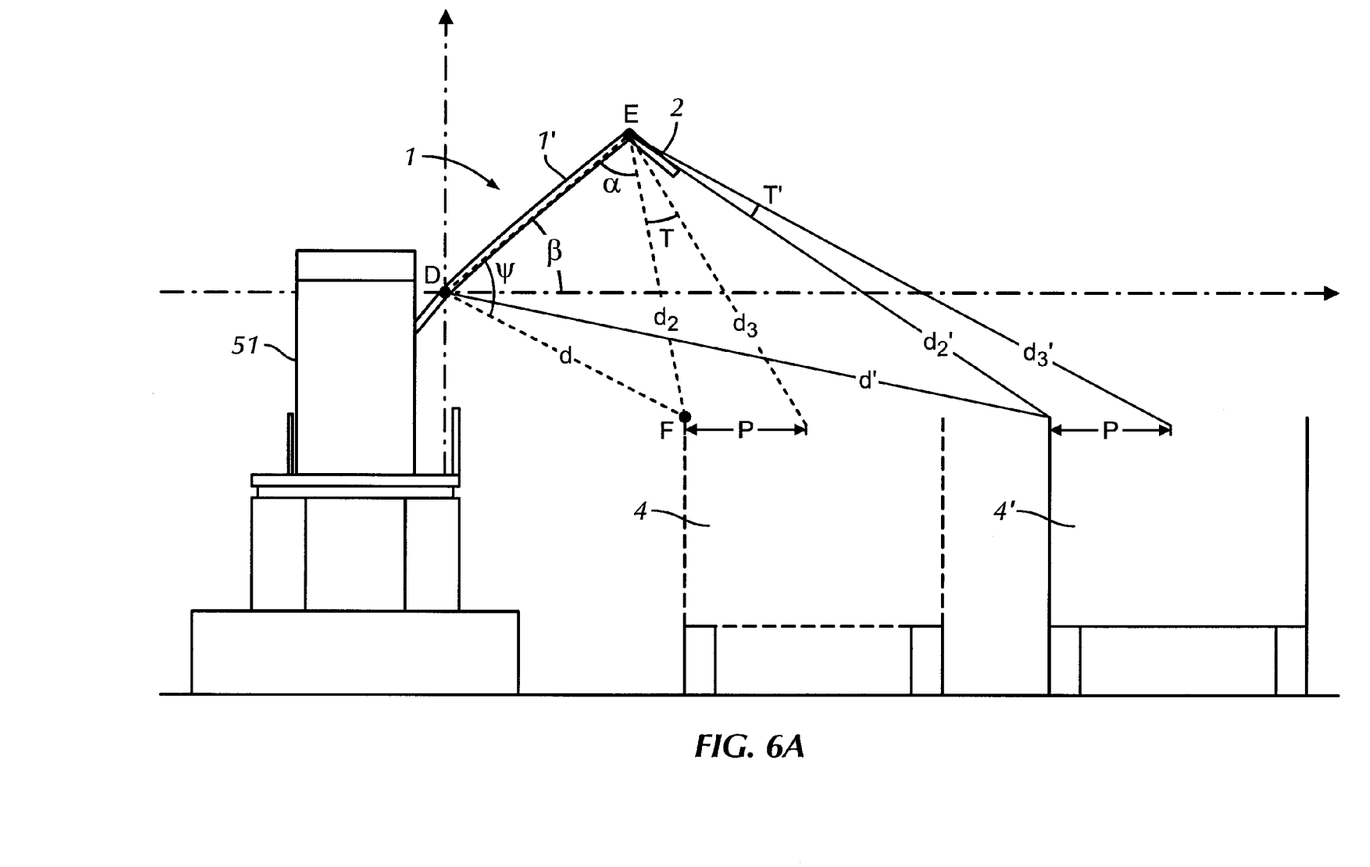
FIG. 6A shows the geometrical parameters that are needed to fill the container at a distance P from the near border.

The invention finally relates to a method to direct the flap 2 of the spout 1 towards a certain position in the container, on the basis of the angle of rotation of the rotatable camera 15. An example of such an arrangement is described below. In FIG. 6*a*, a harvester 51 is schematically depicted, which travels alongside a container 4. The outer part 1' of the spout 1 with flap 2 can rotate around a horizontal axis at its base. A rotatable camera (not shown) can rotate around a horizontal axis through point D on the spout. The flap 2 itself can rotate in relation to the spout at point E. The near border of the container can be seen in cross-section as point F. The distance DE is a constant feature of the harvester. The distance DF is deducible from the 3D image that is captured by the camera. The angle $\psi$ is the angle between the line DF and the line DE (discharge spout). The angle $\beta$ is the angle of orientation of rotatable part 1' of the spout itself relative to the horizontal line. In normal harvesting operation $\beta$ is kept constant. The value of angle $\alpha$ between lines DE and EF is deducible from the knowledge of the length of the spout (distance DE), the distance DF, and the angle $\psi$:

$$\alpha = \arccos \frac{(d_1 - d*\cos\psi)}{\sqrt{d^2 + d_1^2 - 2*d*d_1*\cos\psi}}$$

in which d=|DF|, d1=|DE|

If one supposes that the flap 2 must deposit the crop material at a certain distance P behind the near border of the container, the flap must then be rotated so that it makes an angle T with the line EF. This angle T is calculated by means of the following formula:

$$T = \arccos\left(\frac{d_2 - P*\cos z}{\sqrt{d_2^2 + P^2 - 2*d_2*P\cos z}}\right)$$

in which d2=|EF|=$\sqrt{d^2+d_1^2-2*d*d_1\cos\psi}$ and z=$\alpha+\beta$

The angles $\psi$ and $\beta$ can be determined from a measurement of the angular position of the camera, and the discharge pipe, through the use of a suitable angle measuring instrument placed on the respective axes of rotation.

The method consists of the following steps, which are repeated constantly:
measurement of the distance d
measurement of angles $\psi$ and $\beta$
calculation of the angle $\alpha$
calculation of the angle T
setting the rotation angle $\alpha+T$ of the flap.

FIG. 6a also shows a second position 4' of the container 4. The angle T' is also calculated on the basis of the above formulas and the dumping of the crop material at a distance P from the near border is thus ensured.

Figure 6B:
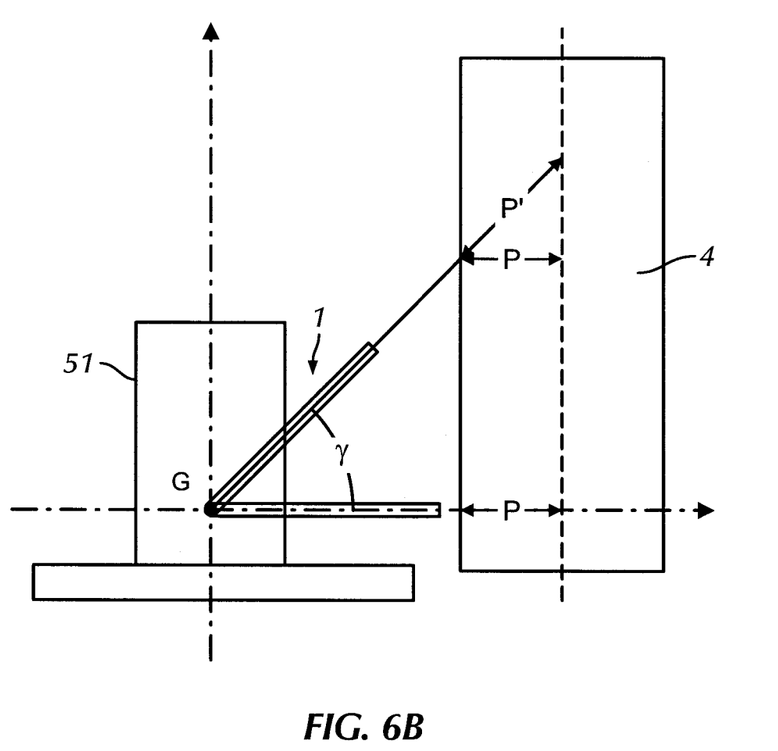
FIG. 6b shows the distance P' and its relationship to P when the spout is not oriented perpendicularly to the container border.

When the discharge spout is not perpendicular to the border 6, see FIG. 6b, then the above formula must be calculated with the distance P' in place of P, wherein:

$$P'=P/\cos\gamma$$

with $\gamma$ the angle of rotation of the spout 2 with respect to the direction which is perpendicular to the container. This angle can be measured in a horizontal plane relative to the pivot point G of the spout.

The invention claimed is:

1. An agricultural harvesting machine comprising—
   a movable unloading apparatus to transport crop material to a container driven in the vicinity of the harvesting machine, so that the container, seen from the harvester, has a near upper border and a remote upper border, and
   a 3D camera rotatably mounted to a first shaft for rotation about a first substantially horizontal axis, the camera configured for capturing images in which at least the near border can be seen, to direct the unloading apparatus based on these images; and
   a light source rotatably mounted to a second shaft to rotate about a second substantially horizontal axis, wherein the light source is in the vicinity of the camera and
   wherein the light source and camera are configured to be controlled by control signals from a control system to simultaneously rotate the light source and the camera around the first and second substantially horizontal axes;
   wherein an angular position of the camera around the first substantially horizontal axis is controlled by the control system so that the near border remains within a predetermined area of the captured image of the camera during the movement of at least one of the harvester and the container;
   wherein the position of the near border is detected on the basis of at least two vertical strips which are defined in the image of the container observed by the camera;
   wherein the predetermined area is a strip between two parallel lines located in the lower half of the observed image of the camera,
   wherein the control system is configured for:
      detecting the near border, and if the border is visible, but none of the positions of the border, as determined by analysis of the vertical strips, is located between the lines then detecting whether the border is located above or under the strip, wherein:
         if the border is located above the strip, turning the camera upwards, and as soon as at least one of the positions is located in the strip, maintaining the camera position,
         if the border is under the strip, rotating the camera downwards, and as soon as at least one of the positions is located in the strip, maintaining the camera position, and
         if the border is not visible in the image, moving the camera to a predetermined starting position.

2. An agricultural harvesting machine according to claim 1, wherein the unloading apparatus comprises a discharge spout with a hinged flap at the end, the camera and the light source being fixed to the bottom of the discharge spout and being configured to pivot about the mutually parallel first and second shafts, the axis of rotation of the light source being located between the axis of rotation of the camera and the hinged flap.

3. An agricultural harvesting machine according to claim 1, wherein the rotation of at least one of the light source and the camera can be controlled by a linear actuator, wherein the linear actuator is configured to be controlled by the control signals from the control system, and in that a mechanical connection is present between the light source and the camera, such that movement of the actuator causes rotation of the light source about the second substantially horizontal axis and rotation of the camera about the first substantially horizontal axis.

4. An agricultural harvesting machine according to claim 2, wherein the rotation of the camera and the light source is controlled by separate actuators controlled by the control system that are controlled by the same control signal.

5. A method for directing a movable unloading apparatus of an agricultural harvesting machine to a container driven in the vicinity of the harvesting machine, the container comprising, as seen from the harvesting machine, a near upper border and a remote upper border, the method comprising the steps of:

using a 3D camera on the harvesting machine for capturing images wherein at least the near border can be seen and the camera is generating image data containing information on the distance between the camera and the near border;

processing the image data for deducing therefrom data on the relative position between the near border and unloading apparatus; and using the relative position data for automatically moving the unloading apparatus relative to the harvesting machine, wherein the camera is mounted rotatably around a substantially horizontal axis of rotation, and wherein the angular position of the camera around this axis is controlled so that the near border remains within a predetermined area of the observed image of the camera during the movement of at least one of the harvester and the container; and the unloading apparatus consists of a discharge spout and a hinged flap on the end of the discharge spout, the position of the flap being controlled on the basis of the detected distance from the near border to the camera, such that the flap is continually directed to a point located at a predetermined distance from the near border;

wherein the position of the near border is detected on the basis of at least two vertical strips which are defined in the image of the container observed by the camera;

wherein the predetermined area is a strip between two parallel lines located in the lower half of the observed image of the camera, the method further comprising the following steps:

detecting the near border, if the border is visible, but none of the positions of the border, as determined by analysis of the vertical strips, is located between the lines:

detecting whether the border is located above or under the strip,

If the border is located above the strip, turning the camera upwards, and as soon as at least one of the positions is located in the strip, maintaining the camera position, If the border is under the strip, rotating the camera downwards, and as soon as at least one of the positions is located in the strip, maintaining the camera position, if the border is not visible in the image, moving the camera to a predetermined starting position.

6. A method according to claim 5, wherein the starting position is a position in which the camera is directed such that the observed image does not only contain the remote border of the container.

7. A method according to claim 5, wherein the position of the flap is controlled on the basis of the angular position of the camera.

\* \* \* \* \*